US012683696B2

(12) United States Patent
Schober et al.

(10) Patent No.: US 12,683,696 B2
(45) Date of Patent: Jul. 14, 2026

(54) DETECTING ATTACKS IN SS-TWR COMMUNICATION

(71) Applicant: NXP B.V., Eindhoven (NL)

(72) Inventors: Michael Schober, Graz (AT); Pablo Corbalán Pelegrín, Callosa de Segura (ES); Manuel Lafer, Ottendorf (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/886,404

(22) Filed: Sep. 16, 2024

(65) Prior Publication Data

US 2025/0119220 A1 Apr. 10, 2025

(30) Foreign Application Priority Data

Oct. 6, 2023 (EP) ..................................... 23202119

(51) Int. Cl.
*H04B 17/30* (2015.01)
*H04W 12/00* (2021.01)
(52) U.S. Cl.
CPC .......... *H04B 17/30* (2015.01); *H04W 12/009* (2019.01)
(58) Field of Classification Search
CPC .............................. H04B 17/30; H04W 12/009
USPC ......................................................... 375/224
See application file for complete search history.

(56) References Cited

U.S. PATENT DOCUMENTS 11,405,247 B2 8/2022 Baier et al.
2020/0403652 A1* 12/2020 Goff ....................... H04J 3/0617

2022/0239532 A1* 7/2022 Niewczas ........... H04L 25/0212
2022/0295430 A1* 9/2022 Schober ........... H04W 56/0055
2023/0099294 A1 3/2023 Kuchler et al.

OTHER PUBLICATIONS

Leu, Patrick et al.; "Ghost Peak : Practical Distance Reduction Attacks Against HRP UWB Ranging"; Proceedings of the 31st USENIX Security Symposium, Boston, Massachusetts; Aug. 10-12, 2022; https://doi.org/10.48550/arXiv.2111.05313.
PNG, Khiam-Boon et al.; "Joint carrier and sampling frequency offset estimation for MB-OFDM UWB system"; 2008 IEEE Radio and Wireless Symposium, Orlando, Florida, Jan. 22-24, 2008; DOI: 10.1109/RWS.2008.4463420.
Singh, Mridula et al.; "Security Analysis of IEEE 802.15.4z/HRP UWB Time-of-Flight Distance Measurement"; WiSec '21: Proceedings of the 14th ACM Conference on Security and Privacy in Wireless and Mobile Networks; Published Jun. 28, 2021; https://doi.org/10.1145/3448300.34678.

* cited by examiner

*Primary Examiner* — Kevin M Burd

(57) ABSTRACT

There is described a communication device, configured to perform a single-sided two-way-ranging, SS-TWR, communication with a further communication device, the communication device comprising a control device being configured to:

i) transmit a first SS-TWR signal to the further communication device, ii) receive a second SS-TWR signal, associated with the first SS-TWR signal, from the further communication device, iii) evaluate a carrier frequency offset of the received second SS-TWR signal, and iv) determine, based on the evaluation, if an attack is performed to the SS-TWR communication.

20 Claims, 5 Drawing Sheets

-prior art-

-prior art-

UWB-signal frequency change HW

DETECTING ATTACKS IN SS-TWR COMMUNICATION

CROSS-REFERENCE TO RELATED APPLICATIONS

This application claims the priority under 35 U.S.C. § 119 of European Patent application no. 23202119.6, filed on 6 Oct. 2023, the contents of which are incorporated by reference herein.

TECHNICAL FIELD

The present disclosure relates to a communication device for a single-sided two-way ranging (SS-TWR) with a further communication device, in particular wherein a carrier frequency offset of a received SS-TWR signal is evaluated with respect to a potential attack. The present disclosure further relates to a communication system and a method of detecting an attack to such a communication system. The disclosure may hence relate to the technical field of wireless communication devices, in particular in the context of ranging and ultra-wideband (UWB) applications.

TECHNICAL BACKGROUND

Wireless communication devices are widely used to enable communication between electronic devices. Such a communication device comprises in general a transmitter for transmitting a (radio frequency, RF) signal and a receiver for receiving a signal, in particular in response to the transmitted signal. Besides an exchange of data, the communication may also include a ranging, i.e., measuring a distance between two or more communication devices. For example, the time of flight (ToF) of a signal between two communication devices may be recorded (e.g., based on timestamps) in order to calculate the physical distance between the two communication devices.

For example, ultra-wideband (UWB) wireless technology enables secure, accurate ranging with errors below 10 cm. The security aspect here comes from the ability of UWB radios to ensure that an attacker cannot shorten the distance estimate, guaranteeing that the measured distance is an upper bound of the actual physical distance between the two UWB-enabled communication devices.

However, the accuracy of one of the simplest and most common ranging schemes, so-called single-sided two-way ranging (SS-TWR), relies on a frequency offset estimator that is susceptible to a potential attack-vector for distance drops. In other words, an attacker may change the measured physical distance between the devices. In an example, wherein the UWB application is used to open the door of a vehicle, the attacker may manipulate the SS-TWR, so that the door will open.

FIG. 8 shows a conventional timing diagram of an IR-UWB (impulse-response UWB) packet exchange for performing a SS-TWR measurement. An initiator device (a communication device) transmits a poll message (a transmitted first signal) that is received by a responder device (a further communication device). After processing the poll message, the responder device transmits a response message (a received second signal associated with the transmitted first signal). Both devices have an accurate system clock which generates a timestamp whenever a message was received or transmitted. The initiator device stores the timestamp t_send_poll at the time, when it transmits its poll message, and the timestamp t_rec_resp, when it receives the response message from the responder device. The responder device stores t_rec_poll, when it receives the poll message, and t_send_resp, when it transmits the response message. The black line between the SYNC and the STS denotes the packet reference marker that is used for generating the timestamps. In practice, the packets can contain a Start-of-Frame Delimiter (SFD) in-between the Preamble SYNC and the STS, while a reference marker or RMARKER is located at the end of the SFD (not shown).

By knowing all the stored timestamps, the Time of Flight (TOF) associated with the UWB message exchange can be calculated. The calculation of the TOF based on the measured timestamps is shown in the following equations:

$$T_{resp} = t_{send\_resp} - t_{rec\_poll}$$

$$T_{round} = t_{rec\_resp} - t_{send\_poll}$$

$$TOF = (T_{round} - T_{resp})/2$$

The measured timestamps can be either exchanged "out-of-band", e.g., using Bluetooth, or "in-band" by using UWB packets containing additionally a data segment for the timestamp exchange. The timestamp exchange method does not affect the ranging packet timing of TOF calculation, so it can be neglected in the calculation.

Every IR-UWB ranging packet contains a pseudo-randomly modulated pulse sequence that is unique for every packet. The sequences are generated based on one or more pre-shared secrets, so both sides (the initiator device and the responder device) know what the sequence of the poll packet and the response packet should be. If the responder device receives a packet whose sequence does not fit to the expected STS, it rejects the packet and does not respond, so the packet exchange will not be used for estimating the TOF. The initiator device behaves in a similar way, if a packet is received whose STS does not match the expected one, the message timestamp is not used for calculating the TOF between the devices. To inject a packet that is validated on the initiator/responder side, an attacker needs to know the STS sequence of the packets, which is not possible with reasonable probability without knowing either the pre-shared secret or receiving the transmitted packet from the initiator/responder. In other words, without knowing the pre-shared secret that is necessary to generate the STS sequence, an attacker can in principle not shorten the measured TOF between the initiator device and the responder device.

The assumption, however, to accurately estimate the TOF using SS-TWR, as shown in the formulas above, is that the initiator device and the responder device have very accurate system clocks without drift or neglectful drift. Alternatively, one of the devices should estimate and compensate for the clock frequency offset introducing that drift, which is the approach commonly taken in conventional UWB devices.

FIG. 9 shows the timing diagram of a SS-TWR communication/exchange with a responder device having a non-ideal clock. This figure assumes that the initiator device has an ideal internal clock with clock frequency f_initiator and that the responder has a non-ideal clock frequency f_responder. The relation between f_initiator and f_responder is as follows:

$$f\_responder = f\_initiator - k_{drift}$$

This means that the physical response time at which the responder device transmits the response packet is scaled with factor $k_{drift}$, but the actual measured response time on the responder side is constant and does not scale with the frequency scaling factor. The relation between the physical and measured response time is as follows:

$$T_{resp\_physical} = T_{resp\_measured}/k_{drift}$$

If the initiator device and the responder device clocks are running on different unknown clock frequencies, this introduces a TOF calculation error. The impact of the clock frequency offset on the TOF calculation is shown by the following formulas:

$$T_{round} = 2 * TOF + T_{resp\_physical}$$

$$TOF_{calc} = (T_{round} - T_{resp\_measured})/2 =$$

$$(2 * TOF + T_{resp\_physical} - T_{resp\_physical} * k_{drift})/2 =$$

$$TOF + (T_{resp\_physical}(1 - k_{drift}))/2$$

Assuming for example a response time of 1 ms and a clock frequency offset of 10 ppm from an ideal clock, the clock drift based TOF calculation error is already 5 ns, which results in a distance measurement error of roughly 1.5 m.

A common method to correct the clock frequency offset (CFO) induced error in SS-TWR is to measure and compensate for the CFO on the responder side in the TOF calculation. This compensation can also be done directly at the initiator. For that, the initiator measures its CFO with respect to the responder and then compensates for it directly in the ToF equation.

The following formula shows the TOF calculation considering the measured clock frequency offset. Compensating for the clock frequency offset significantly improves the accuracy of SS-TWR, which is key for this scheme to be used:

$$TOF_{comp} = ((T_{round} - (T_{resp\_measured}/k_{drift\_measured}))/2 =$$

$$TOF + ((T_{resp\_physical}(1 - (k_{drift}/k_{drift\_measured}))/2 \sim TOF$$

Nevertheless, SS-TWR communication is susceptible to attacks that produce distance drops, i.e., attacks that can shorten the distance estimates, which may be unacceptable for many applications such as the above-mentioned vehicle key use cases. For example, in a SS-TWR implementation without CFO compensation, an attacker could reduce the measured distance by heating up or cooling down one of the devices, aiming to change the clock frequency offset with respect to the nominal frequency of one of the devices towards reducing the estimated distance.

The clock drift compensated SS-TWR version is susceptible to more practical attacks that reduce the calculated TOF by altering the perceived clock drift that is later compensated for. The clock drift can be measured either by looking at the carrier frequency of the incoming signal or across several pulses within the packet. An attacker could for example change the carrier frequency by demodulating the incoming RF-signal and modulating the resulting baseband signal back on a higher carrier frequency. To change the PRF of an IR-UWB packet, the packet needs to be replayed faster or slower depending on the wanted PRF change.

FIG. 10 shows a simplified example of a hardware device (attacker device) 130 that may be used for creating such a frequency offset attack. A signal is received by the attacker device with a carrier frequency fc_orig. This signal is mixed down by an analog complex mixer to the baseband or an intermediate frequency. The down mixing signal frequency is fc0. Afterwards the signal is filtered and mixed up again with the mixer frequency fc1. The resulting signal has now the frequency fc_orig+(fc1−fc0); this means that by controlling the frequencies fc1 and fc0, the attacker can decide the frequency of the signal that is received and the clock frequency offset that the legitimate receiver device measures and compensates for. Altering this clock frequency offset estimate enables the attacker to increase or decrease the distance estimate in a SS-TWR implementation with clock frequency offset compensation. The power amplifier (PA) in this circuitry ensures that the signal has a sufficient signal strength to be detected by the legitimate receiver device.

FIG. 11 shows the timing diagram of a clock drift compensated SS-TWR attack that has a clock frequency offset that was changed by the attacker. For simplicity, an ideal initiator device and a responder device clock frequency is assumed for the scenario. Also, in this example, the attacker device is an ideal attacker that can increase the carrier frequency by the factor $k_{drift\_attack}$ without adding a processing delay, a real-world attacker device might add a few nanoseconds. The signal from the responder device to the initiator device is blocked, so the initiator device receives the signal of the attacker device for estimating the clock frequency offset and the round-trip time. The attacker timing is described in the following formulas:

$$T_{resp\_att} = T_{resp}$$

$$T_{round\_attack} = T_{resp\_att} + 2 * TOF$$

The impact of the attack on the TOF calculation is shown in the following:

$$TOF_{attack} = (T_{round\_attack} - (T_{resp}/k_{drift\_attack}))/2 =$$

$$TOF + ((T_{resp} - (T_{resp}/k_{drift\_attack}))/2)$$

This formula shows that the impact of an attacker device on the TOF calculation can have a linear relation with the clock drift introduced by the attacker. Assuming, in an example, a maximum attack clock drift of 20 ppm and a response time of 1 ms, the attacker may be able to reduce the measured TOF already by roughly 10 ns which leads to a decreased distance measurement by roughly 3 m. This may be unacceptable for many applications, e.g., (passive) access systems.

Thus, considering limited resources and time for the frame processing, to mix-down and up the incoming signal may be a realistic example for an attack to an SS-TWR communication.

SUMMARY OF THE DISCLOSURE

There may be a need to detect an attack to a SS-TWR communication system in an efficient and reliable manner. A communication device, a communication system, a method, and a method of using are provided.

According to an aspect of the present disclosure, it is described a communication device (e.g. a mobile phone), configured to perform a single-sided two-way-ranging (SS-TWR) communication (an interaction of two devices that may include a ranging exchange) with a further communication device (e.g. another mobile phone), the communication device comprising a control device (e.g., one or more processors, an integrated circuit (IC), etc.), configured to:

i) transmit (in particular via an antenna) a first SS-TWR signal to the further communication device, ii) receive (in particular via an antenna) a second SS-TWR signal, associated with the first SS-TWR signal, from the further communication device (i.e., being send in reply to the first SS-TWR signal), iii) evaluate a carrier frequency offset of the received second SS-TWR signal (w.r.t. the first SS-TWR signal), and iv) determine, based on the evaluation, if an attack is performed to the SS-TWR communication (e.g., an attack on the clock frequency offset correction).

According to a further aspect of the present disclosure, it is described a communication system, comprising:

i) the communication device as described above, ii) the further communication device (being constructed similar or different as the communication device); and in particular iii) an attacker device, in particular being configured to attack the SS-TWR communication between the communication device and the further communication device.

According to a further aspect of the present disclosure, it is described a method of detecting an attack in a communication system, the method comprising:

i) transmitting a first SS-TWR signal;

ii) receiving a second SS-TWR signal, associated with the first SS-TWR signal;

iii) evaluating a carrier frequency offset of the SS-TWR signal; and iv) determining, based on the evaluation, if an attack is performed to the communication system.

According to an aspect of the present disclosure, it is described a use (method of using) of a comparison of a carrier frequency offset and a baseband frequency offset to determine an attack in an SS-TWR communication, in particular a UWB communication.

In the context of the present document, the term "communication device" may refer to any electric device that is in particular portable and may establish a wireless communication with a further device, in particular by transmitting/receiving SS-TWR signals. In an example, the communication device comprises only the control device, e.g., a processor or integrated circuit. In another example, the communication device further comprises an antenna and/or is integrated in a larger device such as a mobile phone, a key, a door, a gate, etc. In an example, the communication device comprises a frontend, in particular a UWB frontend.

According to an exemplary embodiment, the invention may be based on the idea that an attack to a SS-TWR communication system can be detected in an efficient and reliable manner, when a received second SS-TWR signal (associated with a transmitted first SS-TWR signal) is evaluated with respect to its carrier frequency offset, e.g., whereby the carrier frequency offset is compared to an integrity criterion (the integrity is checked). The integrity criterion can hereby be a measure if the carrier frequency offset is i)

in an acceptable, and hence trustworthy, range or ii) in an unacceptable, and hence not trustworthy, range. In the latter case, it may be said with a high probability that an attack has been performed with respect to the SS-TWR communication. Such an attack may be performed as described above for FIGS. 8 to 11, using a down-up mixing of an incoming signal in the context of a clock frequency offset correction.

The described (SS-TWR) communication device is configured to estimate the frequency offset between the initiator and the responder devices on the radio frequency (RF) band (carrier frequency). This may be realized, e.g., by time and/or phase tracking units. In other words, the described approach enables the communication device (receiver) to estimate, if the carrier frequency of a signal was changed by an attacker. If the mechanism detects that the carrier frequency was changed, an attacker is present with high probability.

While the above-described SS-TWR communication is generally considered secure, it has been found by the inventors that in particular an attack to the carrier frequency is possible, which may be, however, detected in an efficient manner by evaluation of the carrier frequency offset of said incoming signal.

The evaluation of the carrier frequency offset in the SS-TWR context may be further improved by exemplary embodiments of the disclosure. For example, a comparison of the carrier frequency offset and a baseband frequency offset may be especially reliable in detection and especially difficult to be circumvented by an attacker. In another example, an evaluation of the channel impulse response (CIR) may yield further valuable information to detect the presence of an attack.

The aspects defined above and further aspects of the disclosure are apparent from the examples of embodiment to be described hereinafter and are explained with reference to these examples of embodiment. The disclosure will be described in more detail hereinafter with reference to examples of embodiment but to which the disclosure is not limited.

EXEMPLARY EMBODIMENTS

According to an embodiment, the communication device is configured as an ultra-wideband, UWB, device, and/or wherein the SS-TWR signal is configured as an UWB signal. Thereby, an established and economically important standard technology can be directly applied.

In the context of the present document, the term "ultra-wideband communication" (or ultra-wideband) may refer to a radio technology that can use a very low energy level for short-range, high-bandwidth communications over a large portion of the radio spectrum. UWB may refer to a technology for transmitting information spread over a large bandwidth (>500 MHz). UWB may be defined as an antenna transmission for which emitted signal bandwidth exceeds the lesser of 500 MHz or 20% of the arithmetic center frequency. UWB transmissions may transmit information by generating radio energy at specific time intervals and occupying a large bandwidth. The range of UWB may be for example in the range of tens of meters. An UWB (RF) ranging system may employ the Time-of-Flight principle to determine the distance between a mobile device and a target device (e.g., a car to be opened) and/or anchor devices (markers) on the target device. Usually, a transceiver's transmitter sends out a waveform, commonly a chirp or a pulse, which is either reflected by an object or retransmitted by a second transceiver. Based on the amount of time it takes for the reflection or retransmission to reach the originating transceiver's receiver, the distance between the objects can be calculated. The so determined range between the receiver and the transmitter is then used as a control input (to enable access). In the same manner, payload may be transferred using UWB. In the present context, "UWB communication" includes impulse-radio-ultra-wideband (IR-UWB) (see for example the standards IEEE802.15.4a and IEEE802.15.4z).

In another embodiment, another wireless communication scheme (in particular according to a standard) may be applied that uses SS-TWR, for example WiFi, Bluetooth low energy (BLE), etc.

In an embodiment, the evaluation comprises (at least one of the following):
  i) determine the carrier frequency offset of the received second SS-TWR signal.
  ii) determine a baseband frequency offset of the received second SS-TWR signal.
  iii) compare the carrier frequency offset with the baseband frequency offset.

By comparing the two estimates, one may detect (and counteract) SS-TWR attacks successfully, in particular when they mix down and up the legitimate signal (see examples of such an attack above). To succeed against this comparison-based evaluation, an attacker would be forced to bring both inline, the baseband clock and the RF-band clock. Such an approach may be significantly more challenging for an attacker than just changing the carrier frequency offset, especially considering the increased delay because of the resampling. In other words, resampling the baseband data would add significant complexity to the system and would also add an additional time delay that acts to the disadvantage of the attacker.

In a preferred embodiment, the communication device includes a phase and/or a time tracking unit for estimating the frequency offset between the initiator (communication device) and the responder (further communication device) on the baseband and RF-band (carrier frequency).

For example in today's UWB standards (IEEE and FiRa), it is defined that the carrier frequency (CAFO) and the baseband frequency (BBFO) shall be derived from the same clock. This means the CAFO and BBFO estimate need to be the same or have a fixed offset, e.g., defined by the settings of the UWB PHY (wherein PHY is an acronym specified in the IEEE standard 802.15.4 and stands for "physical layer", so that UWB PHY refers to the UWB physical layer):

$$|BBFO - CAFO - PHY_{offset}| < E_{CAFO} + E_{BBFO}$$

This formula can be checked to ensure that that no attacker device like the one shown in FIG. 10 has been used for shortening the distance estimate. If this formula is not true, an attack may be assumed. BBFO and CAFO are the baseband and carrier frequency offset estimates coming, e.g., from corresponding time/phase tracking units. E_CAFO and E_BBFO are the maximum expected frequency estimate errors that need to be considered because of known hardware limitations. The PHY_offset is in this example the expected offset that has to be set based on the UWB PHY channel settings.

In an embodiment, the control device is configured to: determine if a baseband clock, related to the baseband frequency, and a carrier frequency (RF band) clock, related to the carrier frequency, are inline or have a fixed offset with respect to each other. If this is not the case, the presence of an attack may be indicated.

In an embodiment, the carrier frequency offset determination is based on an energy change and/or phase change over time. There are several established methods of determining a carrier frequency offset. An exemplary example is described for FIGS. 3 and 4 below. Typical state of the art systems can estimate the CAFO with an accuracy of about 0.1 ppm.

In an embodiment, the baseband frequency offset determination is based on an amplitude change over time. There are several established methods of determining a baseband frequency offset. An exemplary example is described for FIG. 5 below.

In an embodiment, the evaluation comprises: analyze a channel impulse response, CIR, with respect to the received second SS-TWR signal. In an embodiment, the analysis comprises: compare a phase (change ratio) behavior of a preamble CIR and a scrambled timestamp sequence (STS) CIR (see e.g., IEEE 802.15.4z). In other words, to analyze the CIR of the preamble and the STS and compare the phase behavior of the found paths inside. It has turned out that the phase can be clearly affected by an attack (in particular as described above). An example of such a phase change is described for FIGS. 6 and 7 below.

In an embodiment, the communication device comprises a phase tracking unit, configured to track a phase with respect to the received second SS-TWR signal. In an embodiment, the communication device comprises a time tracking unit, configured to track a time with respect to the received second SS-TWR signal. These units (see, e.g., FIG. 2) may be used to efficiently determine the carrier frequency offset and/or the baseband frequency offset of an incoming signal (received second signal).

In an embodiment, the communication device comprises a communication functionality, in particular an antenna, configured to transmit the first SS-TWR signal and/or the second SS-TWR signal.

In an embodiment, the method is performed in a vehicle-related application, e.g., a door of a car. In an example, the described concept can be applied in many (UWB) ranging devices that aim to measure its distance to one or more responders using SS-TWR. In an example, this disclosure may be further useful for applications related to: UWB-based fare collection in public transport scenarios, UWB-based payments, physical access control including car access, location-based systems, Internet-of-Things (IoT) devices, etc.

DETAILED DESCRIPTION OF THE DRAWINGS

Figure 1:
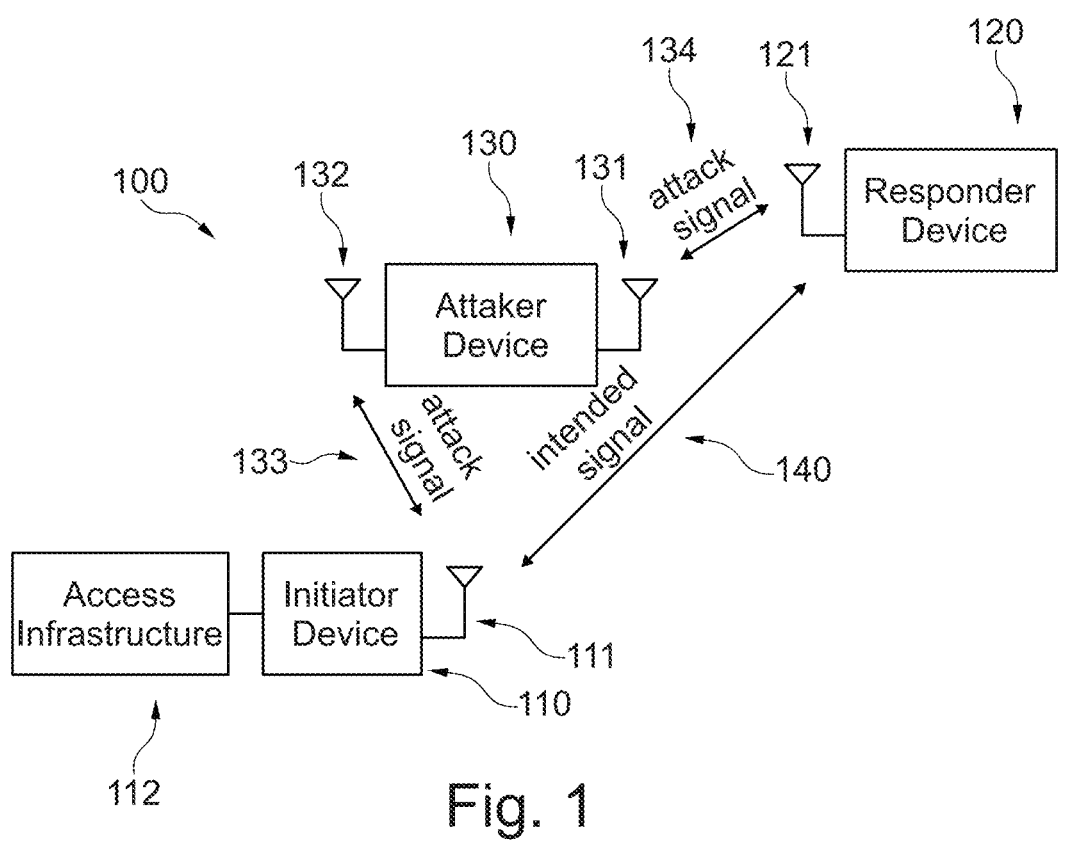
FIG. 1 illustrates a communication system, according to an exemplary embodiment of the disclosure.

Before referring to the drawings, embodiments will be described in further detail, some basic considerations will be summarized based on which embodiments of the disclosure have been developed.

According to an exemplary embodiment, the disclosure proposes a SS-TWR attack detection mechanism based on an evaluation of the carrier frequency offset to estimate if the carrier frequency of a signal was changed by an attacker. If the mechanism detects that the carrier frequency was changed, an attacker is assumed present. In a first example, the comparison of the clock frequency offset estimates obtained from baseband and RF-band frequency tracking loops within a UWB receiver, enables the receiver to estimate if the carrier frequency of a signal was changed by an attacker. In a second example, the comparison of the phase ratio change between the preamble CIR and the STS CIRs enables the receiver to estimate if the carrier frequency of a signal was changed by an attacker.

FIG. 1 shows a communication system 100 according to an exemplary embodiment of the disclosure. The communication system 100 comprises a communication device 110 and a further communication device 120, wherein the communication device 110 performs a single-sided two-way-ranging (SS-TWR) communication with the further communication device 120. The communication device 110 (initiator device) can be further coupled with an access infrastructure 112, e.g., for a vehicle-related application, in particular a door of a car. The communication device 110 comprises an antenna 111 for transmitting and receiving wirelessly SS-TWR signals. Transmission and reception are triggered/controlled by a control device (not shown), e.g., a processor. The control device is configured to (via said antenna 112) transmit a first SS-TWR signal to the further communication device 120, and to receive a second SS-TWR signal, associated with the first SS-TWR signal from the further communication device 120.

The communication system 100 further comprises an attacker device 130. The attacker uses an attack signal against the communication device 110 (attack signal 133 via antenna 132) and/or against the further communication device 120 (attack signal 134 via antenna 131). In order to detect such an attack, the control device of the communication device 110 is configured to evaluate a carrier frequency offset of the received second SS-TWR signal 140 with respect to an integrity check. In case that the case frequency offset does not fulfill the integrity check, an attack is to be assumed. As described below in detail, the evaluation can be further supported by a determination of the baseband frequency offset and/or an analysis of the CIR.

Figure 2:
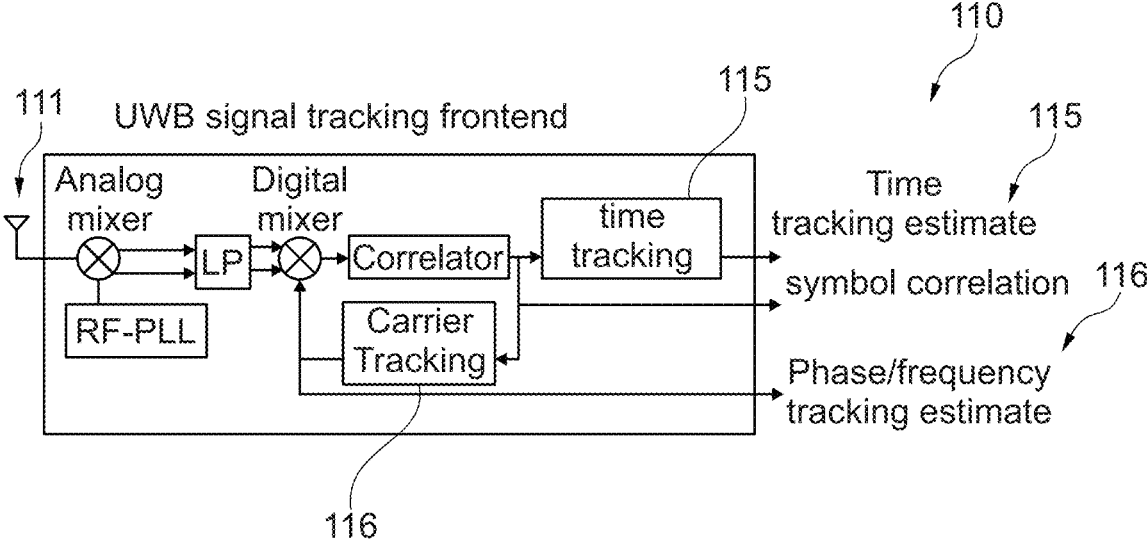
FIG. 2 illustrates a signal tracking frontend of a communication device, according to an exemplary embodiment of the disclosure.

FIG. 2 shows an example of a UWB signal tracking frontend in the communication device 110, according to an exemplary embodiment of the disclosure. Using such a communication device 110, the carrier frequency offset (CAFO) as well as the baseband frequency offset (BBFO) can be estimated. In this specific example, the incoming signal (at antenna 111) is mixed to the baseband and filtered by the analog mixer that is fed by an RF-PLL (phase-locked loop) to obtain a complex signal. Afterwards, the complex signal is filtered and inserted in a digital mixer. The digital mixer is used here for compensating the rest of the residual CAFO. For example, if the RF-PLL is running on 8 GHZ, but the incoming signal has 8 GHz*(1+10 ppm) this residual frequency offset should be compensated. After the digital mixer, the signal is fed into a correlator that is correlating on a known code sequence.

The communication device further comprises a time tracking unit 115 downstream of the correlator to perform a time tracking for the evaluation of the carrier frequency offset. Further, there is a carrier tracking unit (or phase tracking unit 116), coupled to the digital mixer and the correlator, to perform a phase/frequency tracking for the evaluation of the carrier frequency offset.

Figures 3, 4, 5:
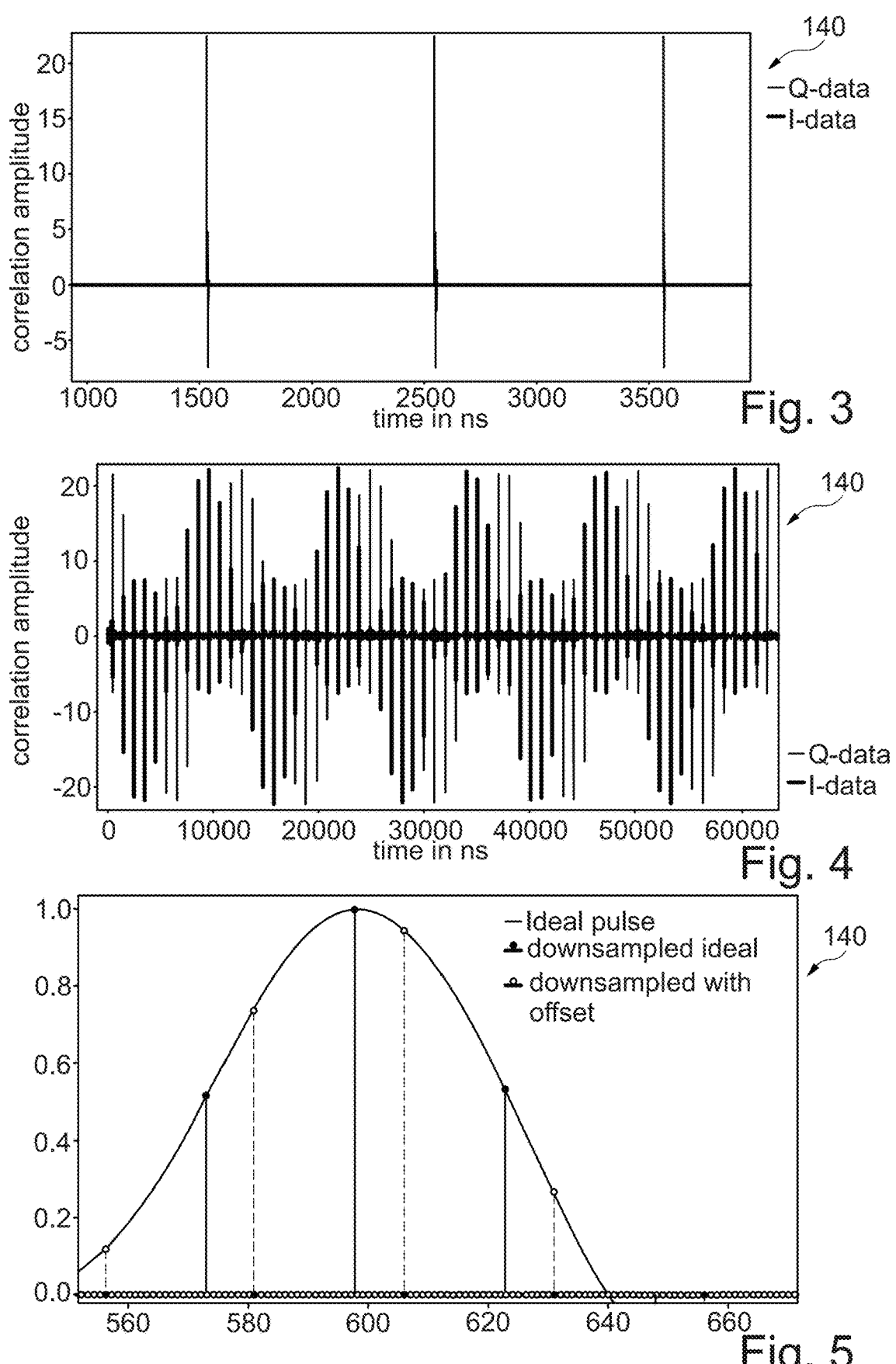
FIGS. 3 and 4 illustrate determining a carrier frequency offset, according to an exemplary embodiment of the disclosure.
FIG. 5 illustrates determining a baseband frequency offset, according to an exemplary embodiment of the disclosure.

FIGS. 3 and 4 show an example of determining the carrier frequency offset of the received second SS-TWR signal 140, according to an exemplary embodiment of the disclosure. It is in particular shown an example of how the CFO affects in a practical system when performing in-phase/quadrature (IQ) sampling.

FIG. 3: a completely frequency synchronized correlator output is shown. There is no energy change between the I- and Q-data over time. Assuming that a mixer is not compensating for any CAFO, based on such a signal, the estimated CAFO would be 0 ppm.

FIG. 4 shows an example of the correlator output for a signal that has an CAFO of 10 ppm (again assuming a digital mixer CAFO of 0 ppm). Because of this residual CAFO, the energy is continuously changing between the I- and Q-data, which is root caused by a continuous phase change. Based on this energy change, a phase change can be observed over time by the carrier tracking unit (phase tracking unit, see above) which allows the receiver device to estimate the CAFO. This CAFO estimate is, in this example, then fed into the digital mixer for compensating negative impacts on the correlation results.

FIG. 5 shows determining the baseband frequency offset, according to an exemplary embodiment of the disclosure. The proposed time tracking unit 115 is focused in this example on the sample amplitude along the samples. FIG. 5 shows an example of an ideal pulse, that is down-sampled once in time ("down sampled ideal" trace) and once with an offset ("down sampled with offset" trace). If a system is completely inline, the sampling unit will always have the same peak to side sample amplitude ratio, but if the baseband timing tracking is off, the amplitude ratio of the samples will continuously change, which means the "down sampled ideal) samples will slowly transform to the "down sampled with offset" samples and vice versa. This sample amplitude change can be observed over time and based on this sampling, the BBFO can be estimated.

The UWB system will lock on the attacker signal and will also configure its tracking loops accordingly.

Figure 6:
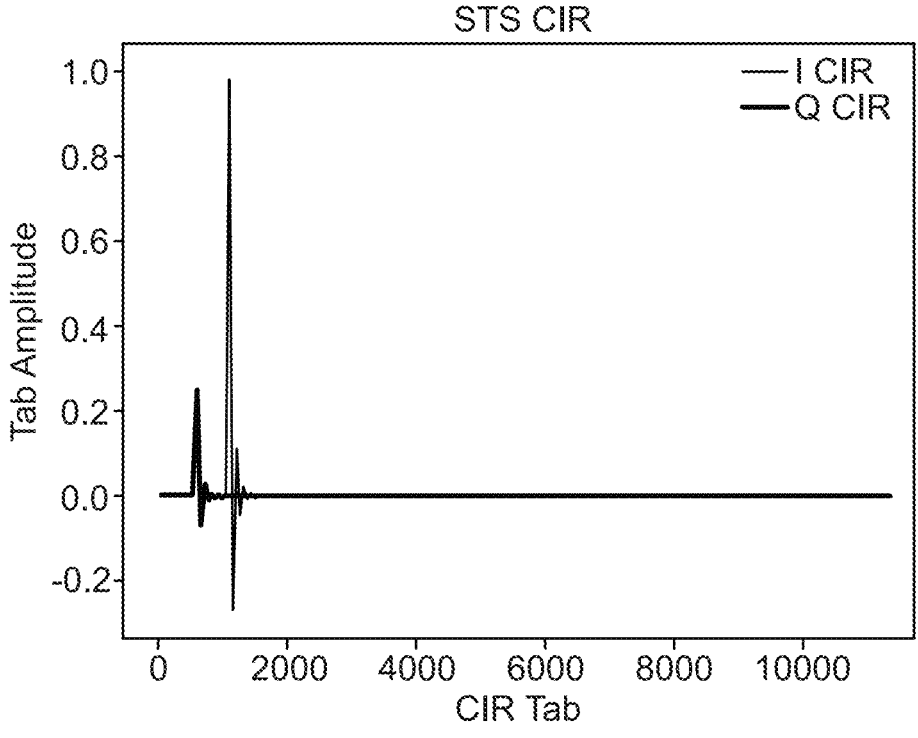
FIGS. 6 and 7 illustrate analyzing a channel impulse response, according to an exemplary embodiment of the disclosure.
Figure 7:
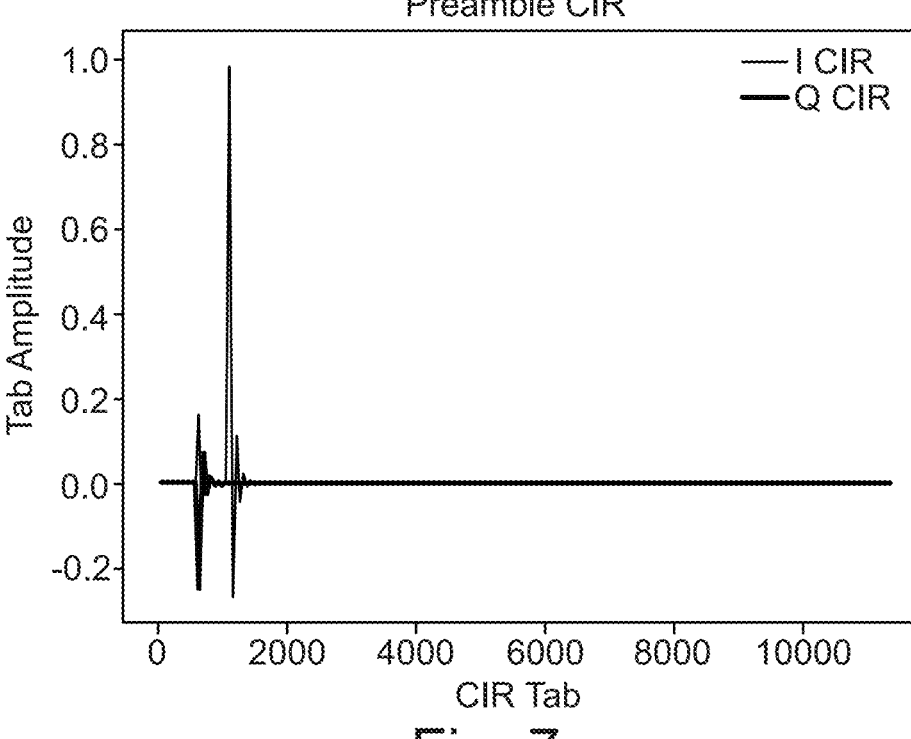
Figure 8:
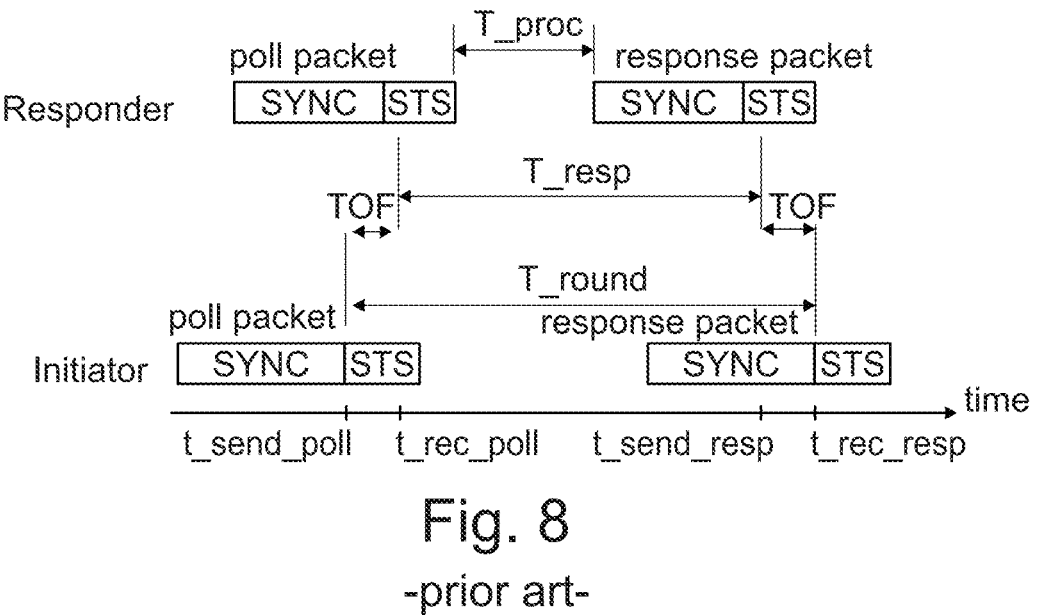
FIG. 8 shows a conventional timing diagram of an IR-UWB packet exchange for performing a SS-TWR measurement.
Figure 9:
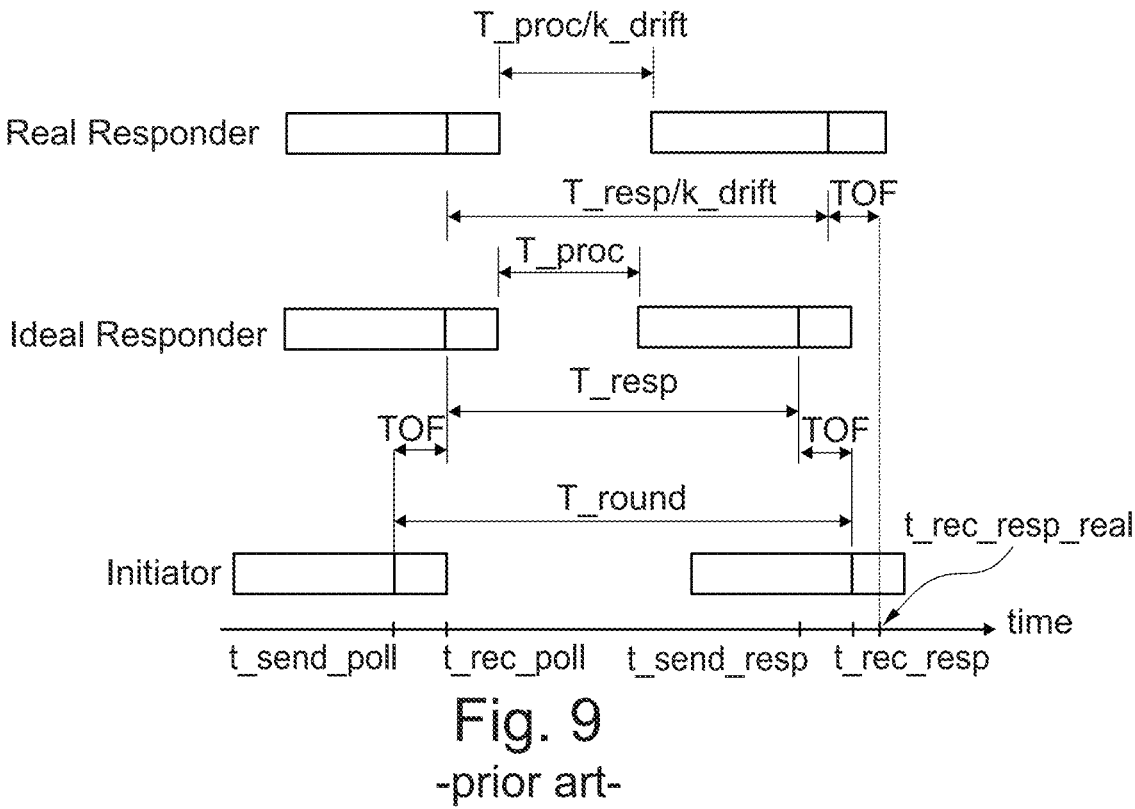
FIG. 9 shows a conventional timing diagram of a SS-TWR communication with a responder device having a non-ideal clock.
Figure 10:
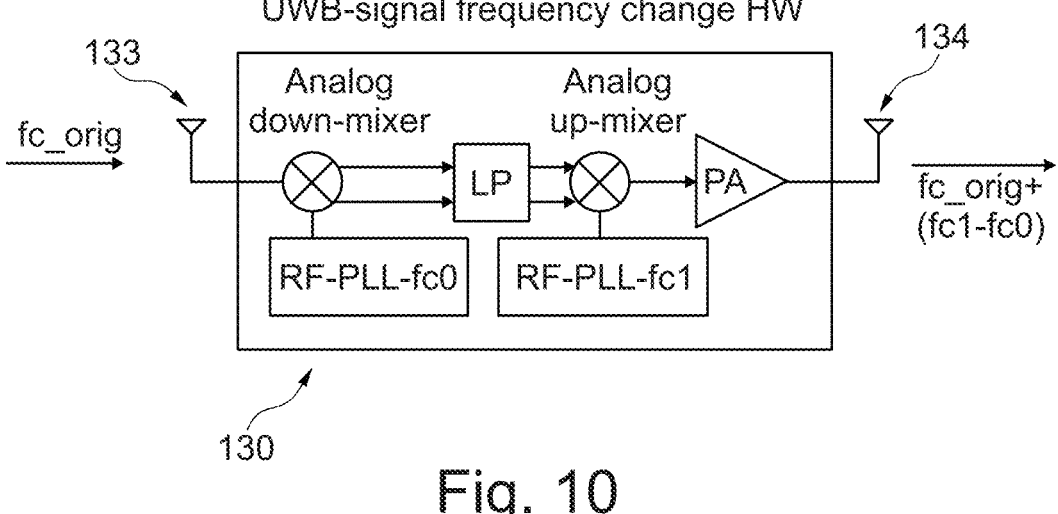
FIG. 10 shows a schematic example of an attacker device that may be used for creating a frequency offset attack.
Figure 11:
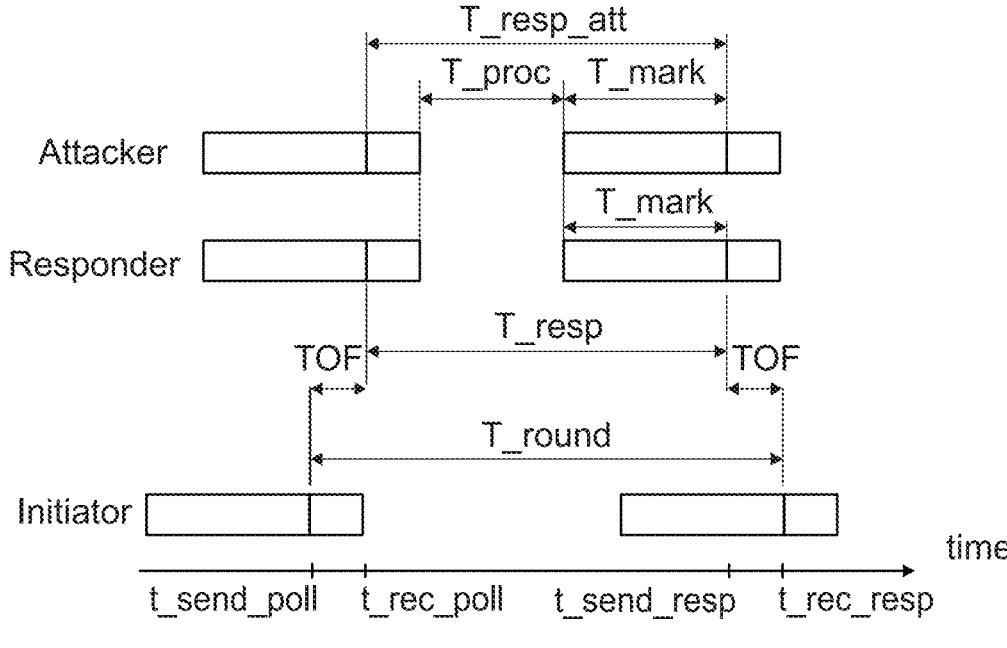
FIG. 11 shows a timing diagram of a clock drift compensated SS-TWR attack that has a clock frequency offset that was changed by the attacker device.

FIGS. 6 and 7 show an analysis of the channel impulse response (CIR), according to an exemplary embodiment of the disclosure.

FIG. 6: in this example of a scrambled timestamp sequence (STS) CIR, a first path (FP) and a main path (MP) have a different phase, which should be constant between a preamble CIR and STS CIR. If an attack is present, the FP may come from the intended ranging device and the MP may come from the attacker. Since only the MP is tracked, the phase will change from CIR to CIR.

FIG. 7: in this example, there is shown a preamble CIR in comparison to the STS CIR in case of an attacker being present. Assuming a time delay of e.g., 32 us between the preamble and the STS, and a frequency offset of 10 ppm, this results in a time shift of 320 ps. Assuming a carrier frequency of ~8 GHZ, which results in a carrier period of ~125 ps, this results in a phase shift of (320% 125)/125*360°=201.6°. This phase shift can be directly observed in the FP to MP phase ratio change. In a concrete implementation, assuming an error margin of e.g., +−18°, 9/10 attacks have been observed in case the FP of the intended signal can still be seen in the CIR.

REFERENCE SIGNS

100 Communication system
110 Communication device
111 First antenna
112 Access infrastructure
115 Time tracking unit
116 Phase tracking unit
120 Further communication device
121 Second antenna
130 Attacker device
131 First attacker antenna
132 Second attacker antenna
133 First attack signal
134 Second attack signal
140 SS-TWR signal

What is claimed is:

1. A communication device configured to perform a single-sided two-way-ranging (SS-TWR) communication with a further communication device, the communication device comprising a control device configured to:
    transmit a first SS-TWR signal to the further communication device;
    receive a second SS-TWR signal, associated with the first SS-TWR signal, from the further communication device;
    compare a carrier frequency offset and a baseband frequency offset of the received second SS-TWR signal to evaluate the received second SS-TWR signal; and
    determine, based on the evaluation, if an attack is performed to the SS-TWR communication.

2. The communication device of claim 1, wherein:
    the communication device is configured as an ultrawideband (UWB) device; and
    the SS-TWR signal is configured as an UWB signal.

3. The communication device of claim 1, wherein, to evaluate the carrier frequency, the control device is configured to:
    determine the carrier frequency offset of the received second SS-TWR signal; and
    determine the baseband frequency offset of the received second SS-TWR signal based on changes in peak-to-side sample amplitude ratios.

4. The communication device of claim 3, wherein the control device is further configured to determine if a baseband clock, related to the baseband frequency, and a carrier frequency clock, related to the carrier frequency, are inline or have a fixed offset with respect to each other.

5. The communication device of claim 3, wherein the carrier frequency offset determination is based on one or more of an energy change or a phase change over time.

6. The communication device of claim 1, wherein the baseband frequency offset determination is based on an amplitude change over time.

7. The communication device of claim 1, wherein the control device is further configured to analyze a channel impulse response (CIR) with respect to the received second SS-TWR signal.

8. The communication device of claim 7, wherein, to analyze the CIR, the control device is configured to compare a phase behavior of a preamble CIR and a scrambled timestamp sequence (STS) CIR.

9. The communication device of one of claim 1, further comprising a phase tracking unit configured to track a phase with respect to the received second SS-TWR signal.

10. The communication device of one of claim 1, further comprising a time tracking unit configured to track a time with respect to the received second SS-TWR signal.

11. The communication device of claim 1, further comprising communication circuitry configured to provide communication functionality including one or more of transmitting the first SS-TWR signal or receiving the second SS-TWR signal.

12. The communication device of claim 11, wherein the communication circuitry comprises an antenna.

13. The communication device of claim 1, wherein the attack aims towards clock frequency offset correction of the SS-TWR communication.

14. A method of detecting an attack in a communication system including a first communication device and a second communication device, the method comprising:
    transmitting a first SS-TWR signal from the first communication device to the second communication device;
    receiving a second SS-TWR signal associated with the first SS-TWR signal at the first communication device from the second communication device;
    comparing, by the first communication device, a carrier frequency offset and a baseband frequency offset of the received second SS-TWR signal to evaluate the second SS-TWR signal; and
    detecting, by the first communication device, an attack on the communication system based on the evaluation.

15. The method of claim 14, wherein the first communication device comprises one of a vehicle control system, a key, or a smartphone.

16. The method of claim 14, wherein the first SS-TWR signal and the second SS-TWR signal are ultra-wideband (UWB) signals.

17. The method of claim 14, further comprising:
    determining, by the first communication device, the carrier frequency offset of the received second SS-TWR signal; and
    determining, by the first communication device, the baseband frequency offset of the received second SS-TWR signal based on changes in peak-to-side sample amplitude ratios.

18. A method of detecting an attack to a SS-TWR communication, the method comprising:
    determining a first SS-TWR signal sent by a first communication device to a second communication device;
    determining, by the first communication device, a second SS-TWR signal received from the second communication device;
    determining, by the first communication device, a carrier frequency offset of the received second SS-TWR signal;

determining, by the first communication device, a baseband frequency offset of the received second SS-TWR signal;

comparing, by the first communication device, the carrier frequency offset and the baseband frequency offset; and determining, by the first communication device, an attack on the SS-TWR communication based on the comparison.

19. The method of claim 18 wherein determining the carrier frequency offset comprises determining one or more of an energy change or a phase change over time for the received second SS-TWR signal.

20. The method of claim 18, wherein determining the baseband frequency offset comprises determining an amplitude change over time for the second SS-TWR signal.

* * * * *